Patented Mar. 14, 1950

2,500,385

UNITED STATES PATENT OFFICE 2,500,385

PROCESS FOR PREPARING NORCAMPHOR

Louis Schmerling, Riverside, Ill., assignor to Universal Oil Products Company, Chicago, Ill., a corporation of Delaware No Drawing. Application December 22, 1945, Serial No. 637,091

3 Claims. (Cl. 260—586)

This invention relates to a process for preparing bicyclic ketones and more particularly it relates to a method for preparing norcamphor.

An object of this invention is to provide an inexpensive procedure for producing a bicyclic ketone from readily available hydrocarbons.

Another object of this invention is to produce norcamphor.

One specific embodiment of this invention relates to a process for producing a bicyclic ketone which comprises chlorinating a mono-olefin-cycloalkadiene adduct, adding water, and heating to effect hydrolysis to a bicyclic ketone.

Another embodiment of this invention relates to a process for producing norcamphor which comprises forming bicyclo-(2,2,1) - 2 - heptene, adding chlorine to said bicyclo-(2,2,1)-2-heptene thereby producing 2-chlorobicyclo-(2,2,1)-2-heptene, and hydrolyzing the last named compound to form bicyclo-(2,2,1)-2-heptanone.

Bicyclo-(2,2,1)-2-heptene used as a starting material for my process is prepared readily by the thermal reaction of ethylene with cyclopentadiene or dicyclopentadiene, preferably under pressure, to form the mentioned bicycloheptene, a compound which is an adduct of ethylene and cyclopentadiene. Other mono-olefins react similarly with cyclopentadiene and dicyclopentadiene forming different alkyl bicycloheptenes which are also utilizable in my process for producing bicyclic ketones. Mono-olefins and conjugated cycloalkadienes react under the influence of heat forming adducts, generally referred to as bicycloalkenes, that are suitable starting materials for my process.

My process is useful for preparing a bicyclic ketone, similar in many of its properties to natural or synthetic camphor and suitable for use in the preparation of plastics, pharmaceuticals, etc. The process consists, for example, in the chlorination of bicyclo-(2,2,1)-2-heptene at a temperature of from about —75° to about 50° C. by a new substitution reaction rather than the expected addition of chlorine to the double bond. The resultant 2-chlorobicyclo-(2,2,1)-2-heptene formed in my process is then hydrolyzed to norcamphor by heating under pressure with water at a temperature of from about 180° to about 300° C. or the hydrolysis may be accomplished by treating the mentioned chloro compound with an aqueous solution of a mineral acid such as sulfuric acid or of phosphoric acid at a temperature of from about 20° to about 50° C. and then diluting the reaction mixture with water and steam distilling to recover the desired ketonic product.

The chlorination and hydrolysis reactions occurring in my process may be represented by the following equations:

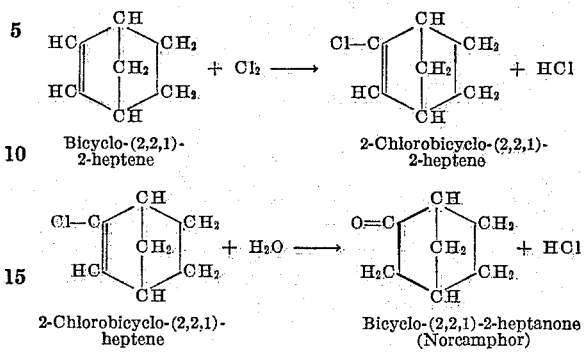

Bicyclo-(2,2,1)-
2-heptene

2-Chlorobicyclo-(2,2,1)-
2-heptene

2-Chlorobicyclo-(2,2,1)-
heptene

Bicyclo-(2,2,1)-2-heptanone
(Norcamphor)

In the above indicated hydrolysis reaction, the 2-chlorobicyclo-(2,2,1)-2-heptene may give as an intermediate 2-hydroxy-bicyclo-(2,2,1)-2-heptene which is the enol form of the desired bicycloheptanone, also known as norcamphor, and into which the unsaturated alcohol or enol compound is converted.

The following examples give results obtained in this process, although these data are not to be construed to limit unduly the broad scope of the invention.

Example I

Bicyclo-(2,2,1)-2-heptene was formed by heating ethylene and dicyclopentadiene in a steel autoclave at 200° C. and about 100 atmospheres initial pressure for five hours. Then chlorine was passed into a stirred solution consisting of 51 grams of bicyclo-(2,2,1)-2-heptene in 100 grams of normal pentane at a temperature of —70° to —75° C. After 42 grams of chlorine had been absorbed, the reaction product was washed, dried, and distilled. The distillation showed that the reaction product contained 30 grams of 2-chlorobicyclo-(2,2,1)-2-heptene boiling at 48° to 49° C. at 9.5 mm. pressure (165° to 166° C. at 760 mm.) and having a refractive index $n_D^{20}$, of 1.4955. Also 24 grams of a higher boiling fraction was obtained consisting of crystalline dichlorobicycloheptane, melting at 44 to 45° C.

Hydrolysis of the 2-chlorobicyclo-(2,2,1)-heptene was effected by heating 11 grams of this material with 100 grams of water in a sealed tube at 250° C. for four hours. Steam distillation of the resultant reaction product gave an oily upper layer which crystallized on standing. The resultant crystals which melted at 95° C. liquefied when mixed with water at room temperature and reacted with semi-carbazide to form a semi-carbazone melting at 197° C. The melting point of the crystalline material thus corresponded closely to that of norcamphor which melts at 94–95° C. and yields a semi-carbazone melting at 196.5° to 197.5° C. Accordingly, the hydrolysis product was norcamphor.

*Example II*

Chlorine was passed into a stirred mixture consisting of 50 grams of bicyclo-(2,2,1)-2-heptene, 98 grams of normal pentane and 30 grams of sodium carbonate at a temperature of 0° to 3° C. After the reaction mixture had gained 36 grams in weight, the product was washed with water, dried and distilled. Analysis of the water washings showed the presence of 15.8 grams of chloride ion, which indicated that much of the chlorine had entered into a substitution reaction with the accompanying evolution of hydrogen chloride which reacted with sodium carbonate. Distillation of the washed and dried reaction product showed that it contained 32 grams of 2-chlorobicyclo-(2,2,1)-2-heptene and 23 grams of crystalline dichlorobicyclo-(2,2,1)-heptane.

Hydrolysis of the 2-chlorobicyclo-(2,2,1)-2-heptane yielded norcamphor.

The foregoing specification and examples are not to be construed to limit the broad scope of this invention.

I claim as my invention:

1. A process for producing norcamphor which comprises reacting bicyclo-(2,2,1)-2-heptene with chlorine to produce 2-chlorobicyclo-(2,2,1)-2-heptene, and hydrolyzing said chlorobicycloheptene to form norcamphor.

2. A process for producing norcamphor which comprises reacting bicyclo-(2,2,1)-2-heptene with chlorine at a temperature of from about −75° to about 50° C. to produce 2-chlorobicyclo-(2,2,1)-2-heptene, and treating said chlorobicycloheptene with water at a temperature of from about 180° to about 300° C. to effect hydrolysis to norcamphor.

3. A process for producing norcamphor which comprises reacting bicyclo-(2,2,1)-2-heptene with chlorine at a temperature of from about −75° to about 50° C. to produce 2-chlorobicyclo-(2,2,1)-2-heptene, and treating said chlorobicycloheptene with an aqueous solution of a mineral acid at a temperature of from about 20° to about 50° C. to effect hydrolysis to norcamphor.

LOUIS SCHMERLING.

REFERENCES CITED

The following references are of record in the file of this patent:

UNITED STATES PATENTS

| Number | Name | Date |
| --- | --- | --- |
| 2,351,311 | Alder et al. | June 13, 1944 |

FOREIGN PATENTS

| Number | Country | Date |
| --- | --- | --- |
| 348,484 | Germany | Feb. 10, 1922 |
| 569,843 | Germany | Feb. 8, 1933 |

OTHER REFERENCES

Richter's Organic Chemistry, Taylor, 3d edition, 1939, vol. II, page 181, Nordemann Publishing Co., New York.